(12) United States Patent
Li

(10) Patent No.: US 8,220,360 B2
(45) Date of Patent: Jul. 17, 2012

(54) HANDLEBAR GRIP HAVING MODULARIZED CONSTRUCTION AND HAVING A LOWER COST OF FABRICATION

(76) Inventor: Jin-Cang Li, Fusing Township, Changhua County (TW)

( * ) Notice: Subject to any disclaimer, the term of this patent is extended or adjusted under 35 U.S.C. 154(b) by 1033 days.

(21) Appl. No.: 12/175,681

(22) Filed: Jul. 18, 2008

(65) Prior Publication Data
US 2010/0011905 A1    Jan. 21, 2010

(51) Int. Cl.
*B62K 21/26* (2006.01)
*B25G 1/10* (2006.01)
*B25G 3/32* (2006.01)

(52) U.S. Cl. .............................. 74/551.9; 16/421; 16/422
(58) Field of Classification Search ................. 74/551.9; 473/300; 16/421, 422; 219/494; 30/276
See application file for complete search history.

(56) References Cited

U.S. PATENT DOCUMENTS

| | | | | |
|---|---|---|---|---|
| 5,823,069 A * | 10/1998 | Roark et al. | ................. | 74/551.9 |
| 6,112,618 A * | 9/2000 | Yates | ............................ | 74/551.9 |
| 6,114,668 A * | 9/2000 | Ogata et al. | .................... | 219/494 |
| 6,516,496 B2 * | 2/2003 | Ekron | .............................. | 16/422 |
| 6,823,562 B1 * | 11/2004 | Smith et al. | ...................... | 16/421 |
| 7,174,639 B2 * | 2/2007 | Warashina et al. | ............. | 30/276 |
| 7,563,174 B1 * | 7/2009 | Hung | ............................ | 473/300 |
| 7,942,077 B2 * | 5/2011 | Lai | ................................ | 74/551.9 |
| 2008/0173126 A1 * | 7/2008 | Madden | ........................ | 74/551.9 |
| 2009/0031847 A1 * | 2/2009 | Grimes | ......................... | 74/551.9 |

* cited by examiner

*Primary Examiner* — Vinh T. Luong

(57) ABSTRACT

A handlebar grip for a bicycle includes a handlebar, two hard shells detachably combined with each other to form a clamping housing which presses an outer wall of the handlebar and is provided with at least one hollow portion, and a soft inner sleeve clamped between an inner wall of the clamping housing and the outer wall of the handlebar and having an outer wall provided with at least one soft protruding portion extending through the hollow portion of the clamping housing and protruding outwardly from an outer wall of the clamping housing to form a soft holding surface. Thus, the two shells of the clamping housing and the inner sleeve can be changed individually according to a user's requirement, thereby enhancing the versatility of the handlebar grip.

10 Claims, 10 Drawing Sheets

HANDLEBAR GRIP HAVING MODULARIZED CONSTRUCTION AND HAVING A LOWER COST OF FABRICATION

BACKGROUND OF THE INVENTION

1. Field of the Invention

The present invention relates to a handlebar grip and, more particularly, to a handlebar grip for a bicycle.

2. Description of the Related Art

A conventional handlebar grip for a bicycle comprises a preformed hollow inner shell made of a hard plastic material, and a soft plastic outer sleeve integrally coated around the outer wall of the inner shell by a plastic injection forming machine. Thus, the hard plastic inner shell is mounted on a handlebar to provide a basic strength of the handlebar grip, and the soft plastic outer sleeve provides a comfortable sensation to the user. However, the hard plastic inner shell cannot be directly mounted on the handlebar, so that the hard plastic inner shell has at least one end provided with an extension protrusion, and a metallic clamping ring is mounted on the extension protrusion to clamp the hard plastic inner shell on the handlebar, thereby increasing the costs of fabrication. In addition, the hard plastic inner shell and the soft plastic outer sleeve are combined integrally, so that the hard plastic inner shell and the soft plastic outer sleeve cannot be selected or changed according to a user's requirement, thereby decreasing the versatility of the handlebar grip. Further, the hard plastic inner shell and the soft plastic outer sleeve are combined integrally, so that the user has to replace the whole handlebar grip when the soft plastic outer sleeve is dirty or worn out, thereby increasing the costs of material. Further, when the user wishes to add an end plug or a secondary handlebar to the handlebar grip, it is necessary to provide a metallic clamping ring to clamp the end plug or secondary handlebar on the hard plastic inner shell, thereby increasing the costs of production.

BRIEF SUMMARY OF THE INVENTION

In accordance with the present invention, there is provided a handlebar grip, comprising a handlebar, two opposite hard shells detachably combined with each other to form a hollow clamping housing which presses an outer wall of the handlebar and is provided with at least one hollow portion, and a soft inner sleeve clamped between an inner wall of the clamping housing and the outer wall of the handlebar and having an outer wall provided with at least one soft protruding portion extending through the hollow portion of the clamping housing and protruding outwardly from an outer wall of the clamping housing to form a soft holding surface.

The primary objective of the present invention is to provide a bicycle handlebar grip having a modularized construction and having a lower cost of fabrication.

Another objective of the present invention is to provide a handlebar grip for a bicycle, wherein the two shells of the clamping housing and the inner sleeve can be changed individually according to a user's requirement, thereby enhancing the versatility of the handlebar grip.

A further objective of the present invention is to provide a handlebar grip for a bicycle, wherein the inner sleeve can be replaced individually when it is dirty or worn out without having to replace the clamping housing simultaneously, thereby decreasing the costs of material.

A further objective of the present invention is to provide a handlebar grip for a bicycle, wherein the two shells of the clamping housing and the inner sleeve have a modularized design to enhance the variation of the handlebar grip, thereby satisfying the user's requirement.

A further objective of the present invention is to provide a handlebar grip for a bicycle, wherein the clamping housing is made of hard material to enhance the strength of the handlebar grip, and the inner sleeve is made of soft material to provide a comfortable sensation to the user.

A further objective of the present invention is to provide a handlebar grip for a bicycle, wherein the end plug or the secondary handlebar is directly mounted on the clamping housing without needing to provide a metallic clamping ring, thereby decreasing the costs of material.

A further objective of the present invention is to provide a handlebar grip for a bicycle, wherein the clamping housing clamps the outer wall of the handlebar, and the protruding portion of the inner sleeve is locked in the hollow portion of the clamping housing, so that the inner sleeve is clamped between the clamping housing and the handlebar solidly and stably.

A further objective of the present invention is to provide a handlebar grip for a bicycle, wherein the inner sleeve is directly mounted on the outer wall of the handlebar, and the two shells of the clamping housing are directly mounted on the inner sleeve, so that the inner sleeve is mounted between the clamping housing and the handlebar easily and quickly, thereby facilitating assembly of the handlebar grip.

A further objective of the present invention is to provide a handlebar grip for a bicycle, wherein the two shells of the clamping housing and the inner sleeve are made individually without interfering with each other, thereby enhancing the productive quality of the handlebar grip.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
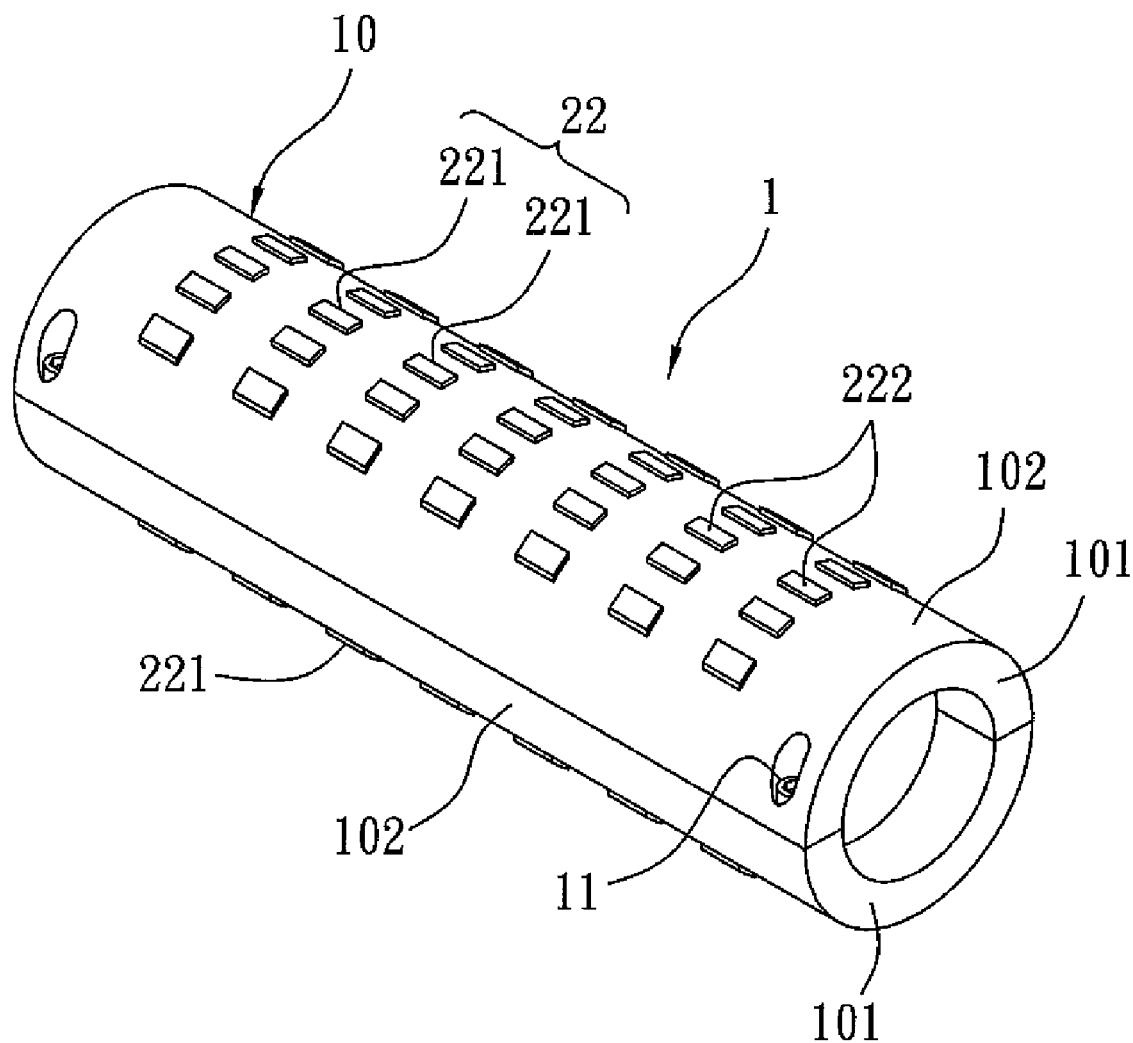
FIG. 1 is a perspective view of a handlebar grip for a bicycle in accordance with the preferred embodiment of the present invention.
Figure 2:
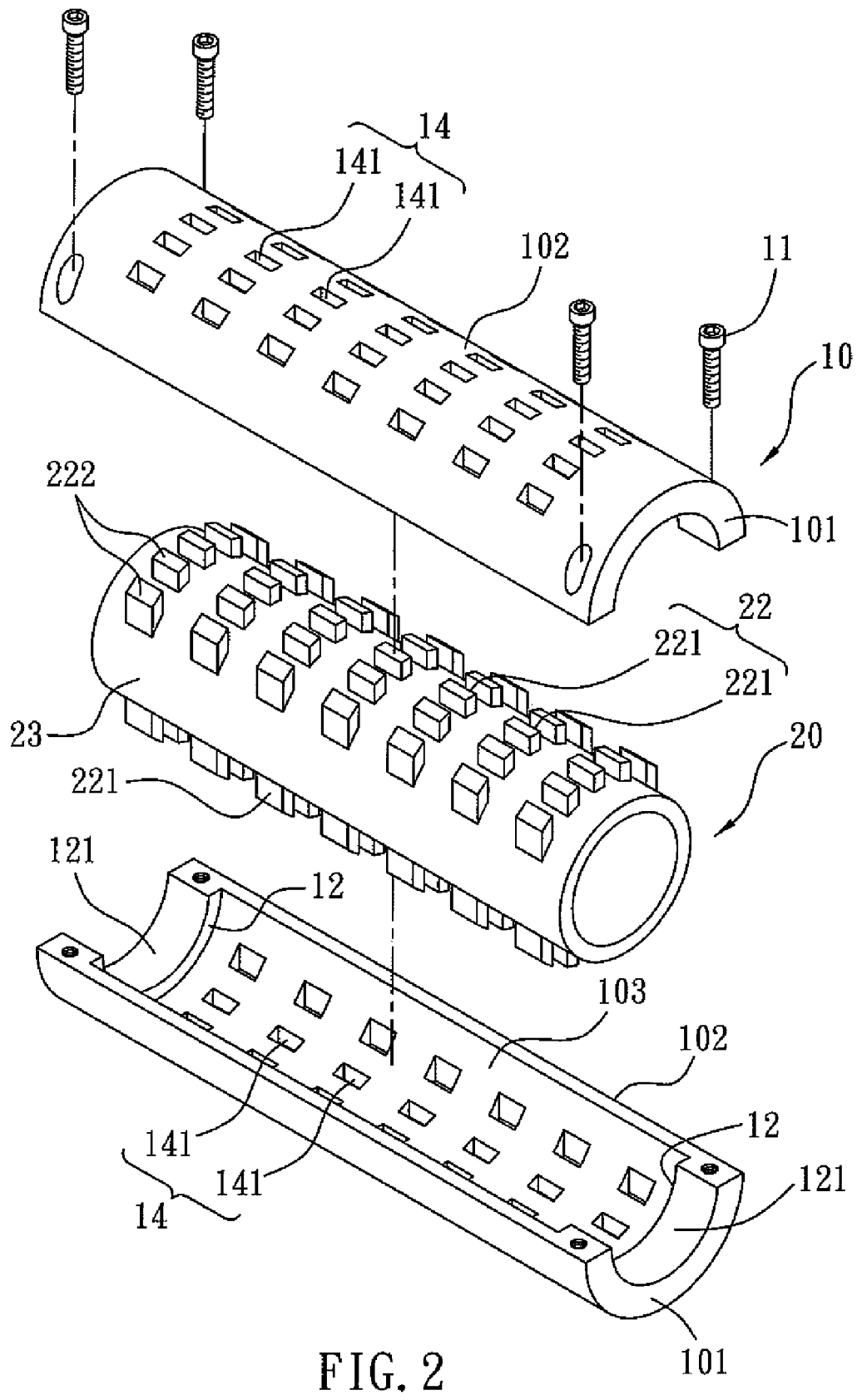
FIG. 2 is an exploded perspective view of the handlebar grip for a bicycle as shown in FIG. 1.
Figure 3:
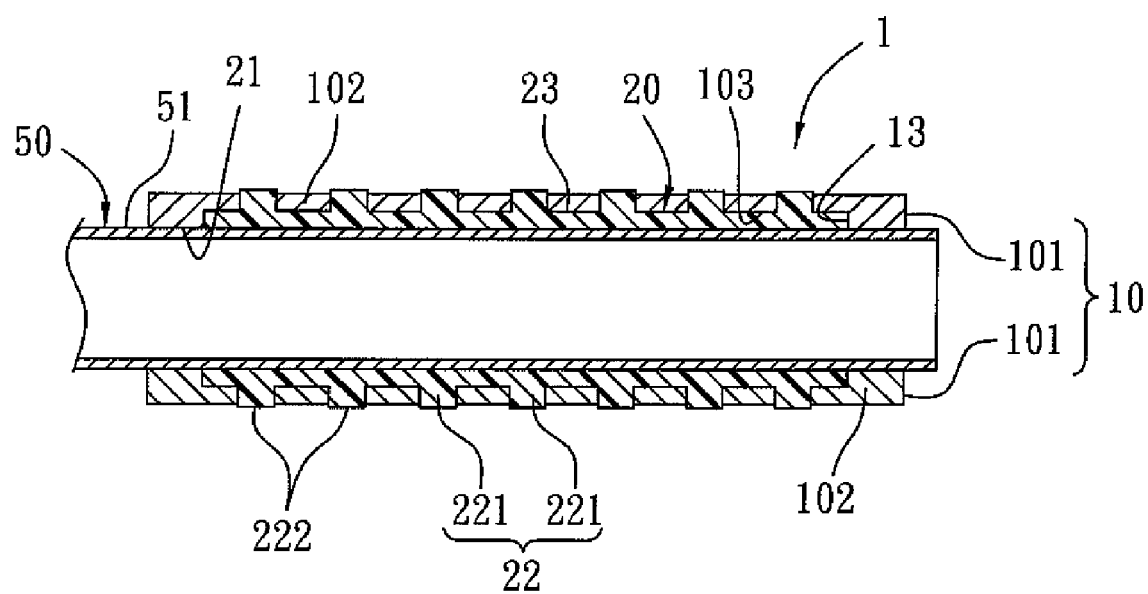
FIG. 3 is a front cross-sectional view of the handlebar grip for a bicycle as shown in FIG. 1.

Referring to the drawings and initially to FIGS. 1-3, a handlebar grip 1 for a bicycle in accordance with the preferred embodiment of the present invention comprises a handlebar 50, two opposite hard shells 101 detachably combined with each other to form a hollow clamping housing 10 which presses an outer wall 51 of the handlebar 50 and is provided with at least one hollow portion 14, and a soft inner sleeve 20 clamped between an inner wall 103 of the clamping housing 10 and the outer wall 51 of the handlebar 50 and having an outer wall 23 provided with at least one soft protruding portion 22 extending through the hollow portion 14 of the clamping housing 10 and protruding outwardly from an outer wall 102 of the clamping housing 10 to form a soft holding surface 222 to facilitate a user holding the clamping housing 10.

The clamping housing 10 has a tubular shape. Each of the two shells 101 of the clamping housing 10 is made of a composite material, such as a metallic material or carbon fiber and has a semi-tubular shape. The two shells 101 of the clamping housing 10 are combined together by a plurality of locking bolts 11. In the preferred embodiment of the present invention, each of the two shells 101 of the clamping housing 10 has two opposite sides each having two opposite ends to allow passage of the locking bolts 11 so as to combine the two shells 101 of the clamping housing 10 together. Alternatively, each of the two shells 101 of the clamping housing 10 has a first side and a second side, wherein the first sides of the two shells 101 of the clamping housing 10 are pivotally connected with each other, and the second sides of the two shells 101 of the clamping housing 10 are combined together by the locking bolts 11.

The hollow portion 14 of the clamping housing 10 is provided on each of the two shells 101. The hollow portion 14 of the clamping housing 10 includes at least one through hole 141. In the preferred embodiment of the present invention, the hollow portion 14 of the clamping housing 10 includes a plurality of rectangular through holes 141. The inner wall 103 of the clamping housing 10 is provided with two opposite annular stop ribs 12 extending radially and inwardly and abutting two opposite ends of the inner sleeve 20 to limit the inner sleeve 20 in the clamping housing 10. The inner wall 103 of the clamping housing 10 forms an annular receiving chamber 13 (see FIG. 3) located between the two stop ribs 12 to receive the inner sleeve 20 when the two shells 101 of the clamping housing 10 are combined together. Each of the two stop ribs 12 of the clamping housing 10 has a surface provided with an arc-shaped clamping block 121 pressing the outer wall 51 of the handlebar 50 when the two shells 101 of the clamping housing 10 are combined together.

The inner sleeve 20 is made of plastic or rubber material. The inner sleeve 20 has a tubular shape and has an inner diameter substantially equal to an outer diameter of the handlebar 50. The protruding portion 22 of the inner sleeve 20 includes at least one protruding block 221 inserted into and protruding outwardly from the through hole 141 of the hollow portion 14 of the clamping housing 10. In the preferred embodiment of the present invention, the protruding portion 22 of the inner sleeve 20 includes a plurality of rectangular protruding blocks 221 inserted into and protruding outwardly from the through holes 141 of the hollow portion 14 of the clamping housing 10.

In assembly, the inner sleeve 20 is initially mounted on the outer wall 51 of the handlebar 50. Then, the two shells 101 of the clamping housing 10 are mounted on the inner sleeve 20 so that the inner sleeve 20 is received in the receiving chamber 13 of the clamping housing 10, and the protruding portion 22 of the inner sleeve 20 is inserted into and protrudes outwardly from the hollow portion 14 of the clamping housing 10. Finally, the two shells 101 of the clamping housing 10 are combined together by the locking bolts 11 so that the clamping housing 10 is locked onto the outer wall 51 of the handlebar 50, and the inner sleeve 20 is clamped between the inner wall 103 of the clamping housing 10 and the outer wall 51 of the handlebar 50.

Figure 4:
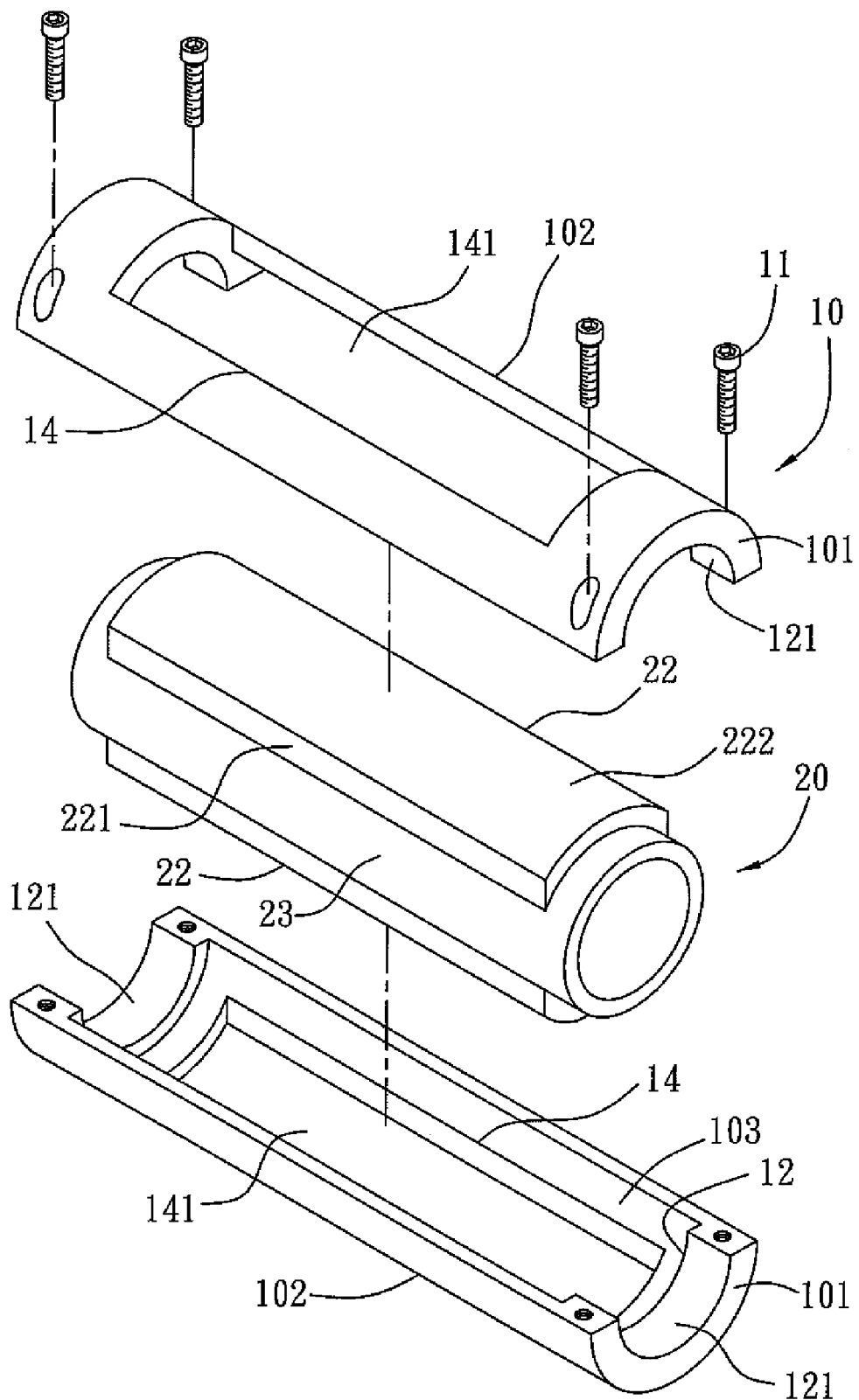
FIG. 4 is an exploded perspective view of a handlebar grip for a bicycle in accordance with another preferred embodiment of the present invention.

Referring to FIG. 4, the hollow portion 14 of the clamping housing 10 includes an elongate through slot 141, and the protruding portion 22 of the inner sleeve 20 includes an elongate protruding block 221 inserted into and protruding outwardly from the through slot 141 of the hollow portion 14 of the clamping housing 10.

Figure 5:
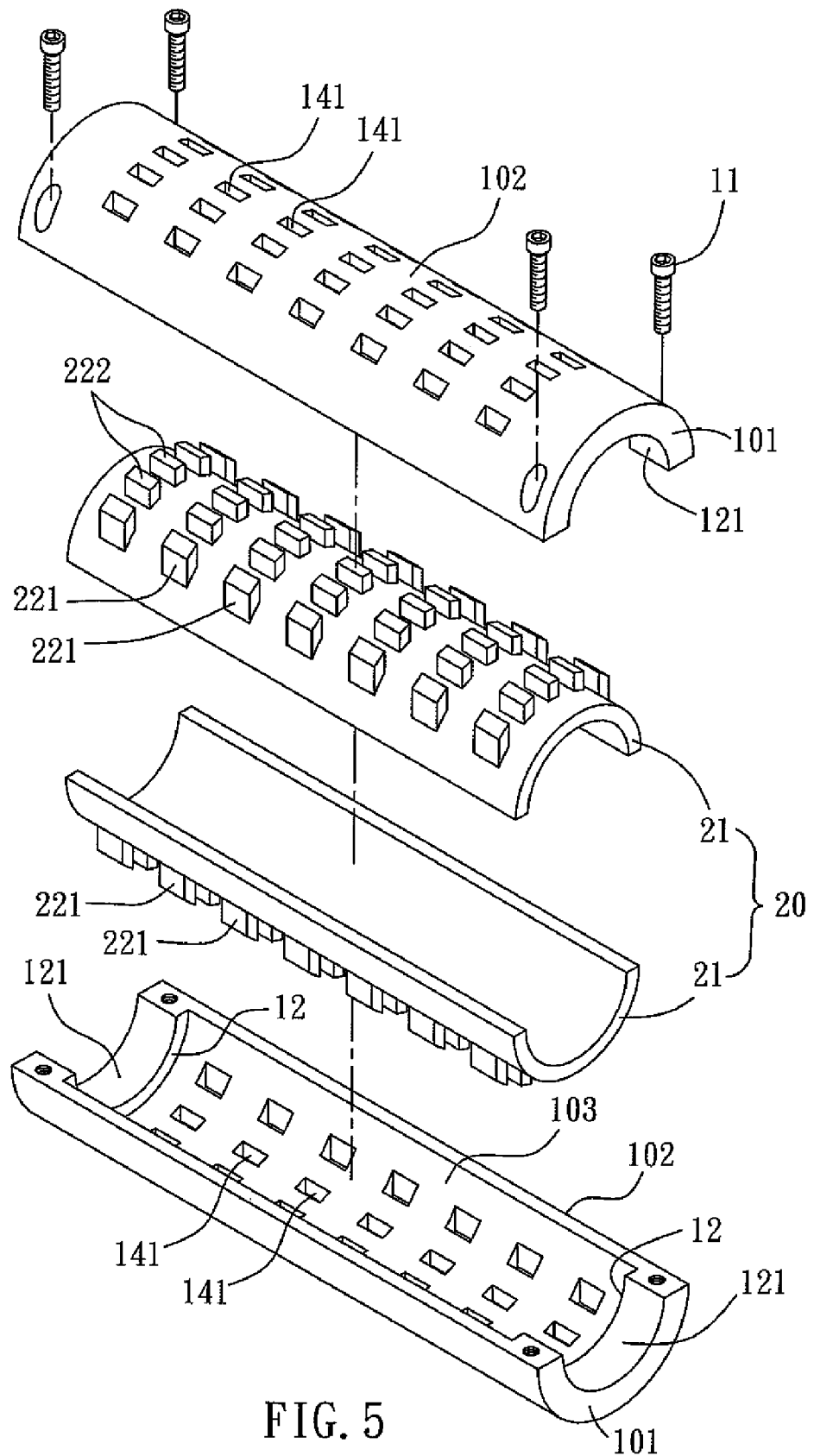
FIG. 5 is an exploded perspective view of a handlebar grip for a bicycle in accordance with another preferred embodiment of the present invention.

Referring to FIG. 5, the inner sleeve 20 includes two opposite arc-shaped plates 21 juxtaposed to each other to form a tubular body.

Figure 7:
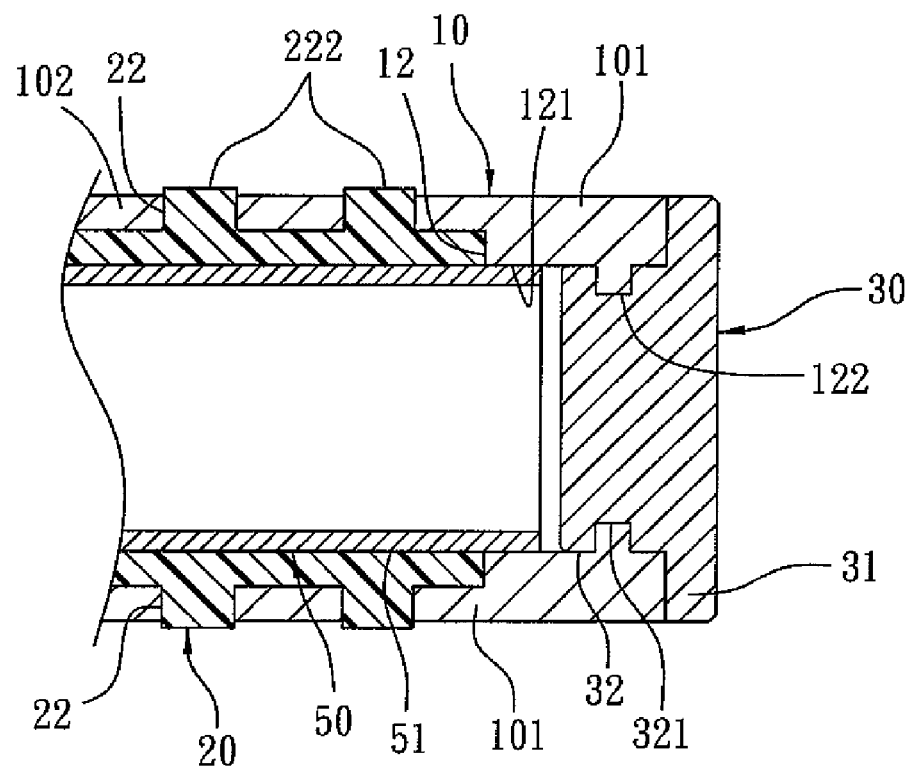
FIG. 7 is a partially front cross-sectional assembly view of the handlebar grip for a bicycle as shown in FIG. 6.
Figure 6:
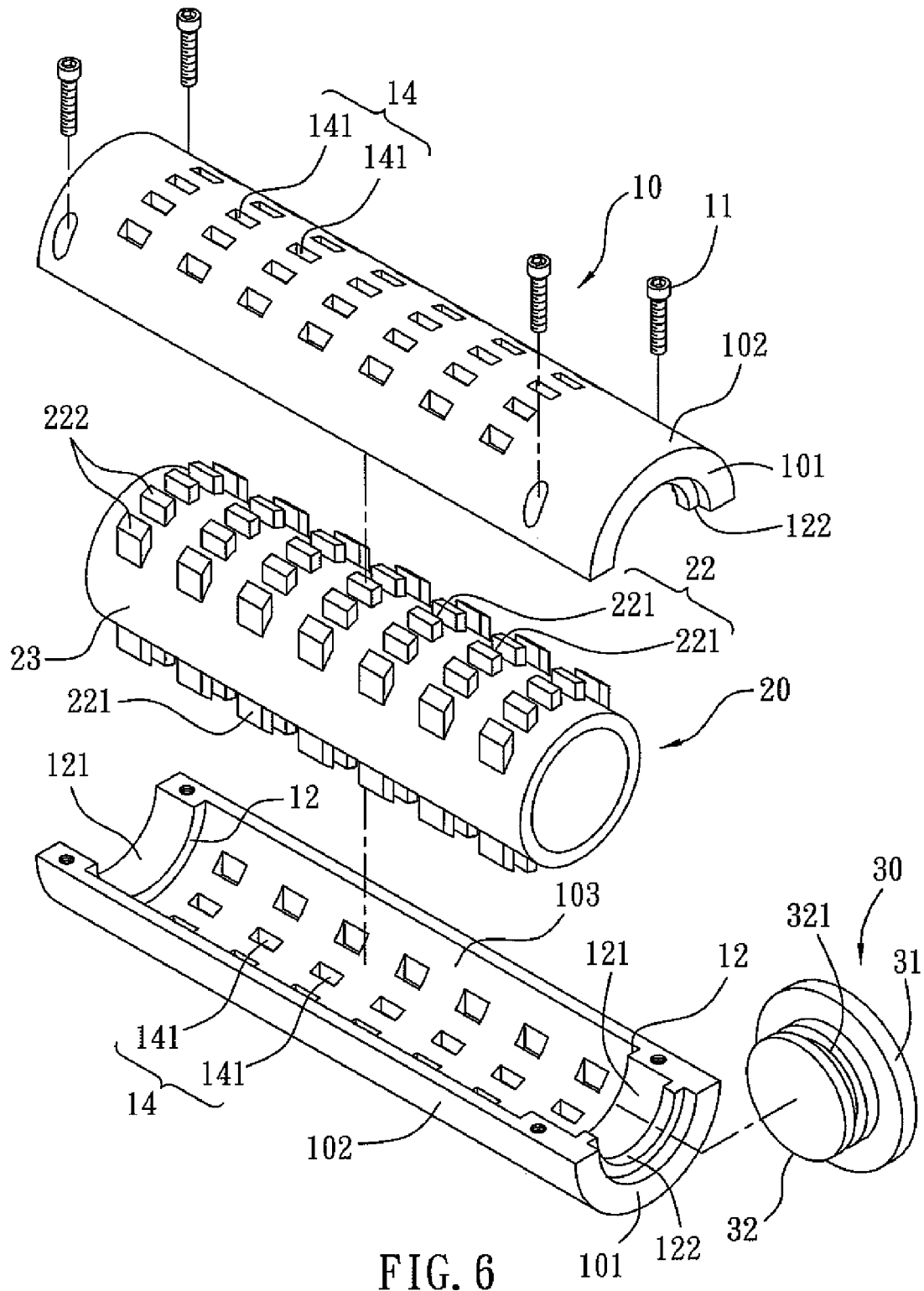
FIG. 6 is an exploded perspective view of a handlebar grip for a bicycle in accordance with another preferred embodiment of the present invention.

Referring to FIGS. 6 and 7, the handlebar grip further comprises an end plug 30 mounted on an outer end portion of the clamping housing 10 to seal the outer end portion of the clamping housing 10 so as to enhance the aesthetic quality of the clamping housing 10. The end plug 30 has a first side provided with a sealing plate 31 located outside of and abutting the outer end portion of the clamping housing 10 and a second side provided with a mounting stud 32 which extends into the outer end portion of the clamping housing 10 and has an outer wall provided with an annular locking groove 321. The mounting stud 32 of the end plug 30 is clamped between the two shells 101 of the clamping housing 10, and each of the two shells 101 of the clamping housing 10 has an inner wall provided with a semi-circular locking flange 122 located in the clamping block 121 and inserted into the locking groove 321 of the mounting stud 32 when the two shells 101 of the clamping housing 10 are combined together to secure the mounting stud 32 of the end plug 30 between the two shells 101 of the clamping housing 10 and to attach the end plug 30 to the clamping housing 10.

Figure 8:
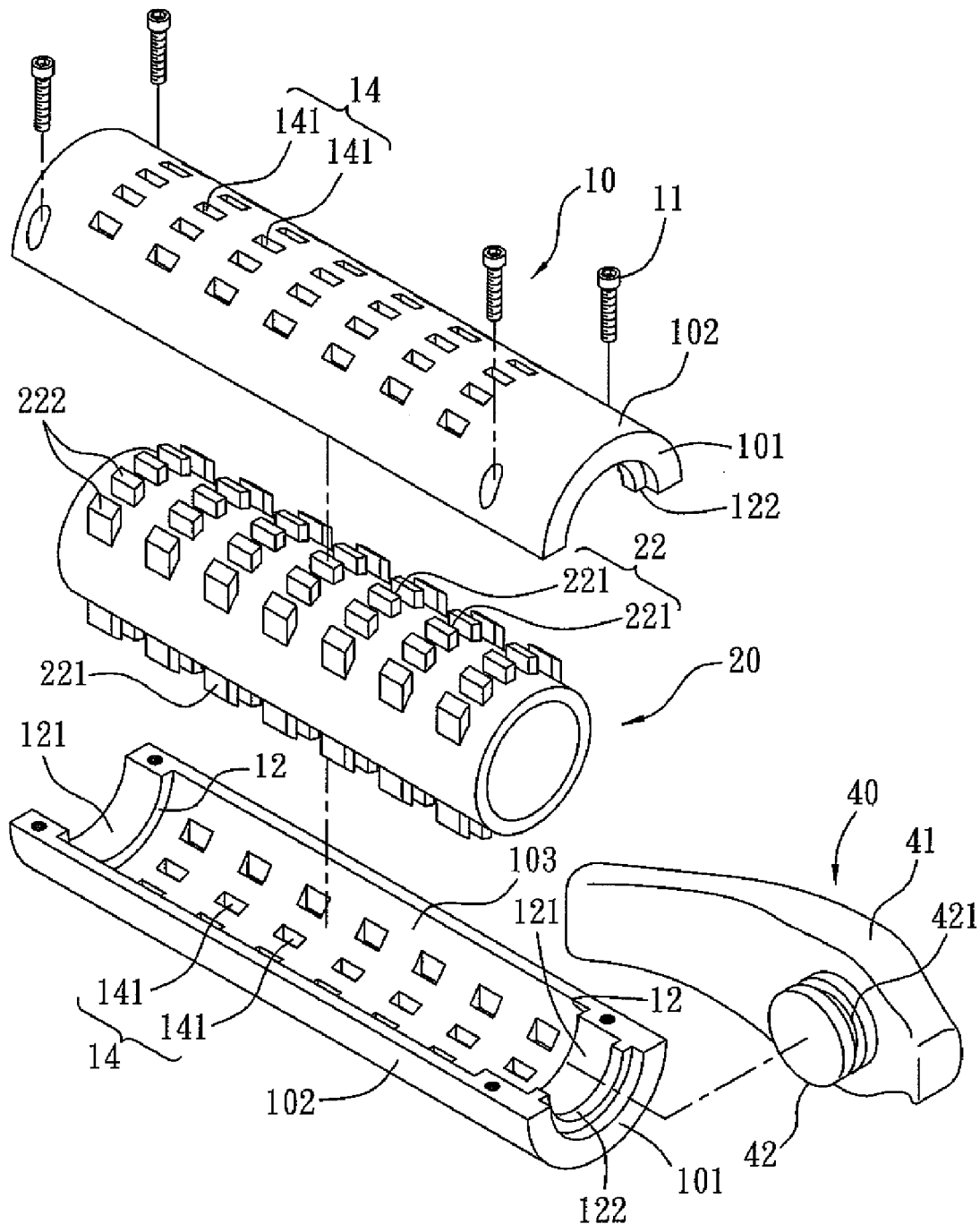
FIG. 8 is an exploded perspective view of a handlebar grip for a bicycle in accordance with another preferred embodiment of the present invention.
Figure 9:
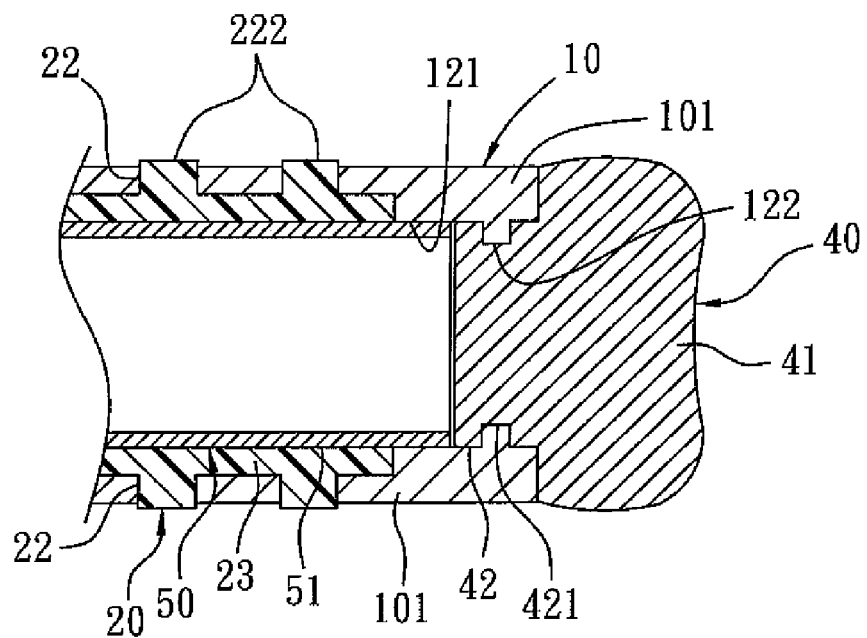
FIG. 9 is a partially front cross-sectional assembly view of the handlebar grip for a bicycle as shown in FIG. 8.

Referring to FIGS. 8 and 9, the handlebar grip further comprises a secondary handlebar 40 mounted on an outer end portion of the clamping housing 10. The secondary handlebar 40 has a first side provided with a holding portion 41 located outside of and abutting the outer end portion of the clamping housing 10 and a second side provided with a mounting stud 42 which extends into the outer end portion of the clamping housing 10 and has an outer wall provided with an annular locking groove 421. The mounting stud 42 of the secondary handlebar 40 is clamped between the two shells 101 of the clamping housing 10, and each of the two shells 101 of the clamping housing 10 has an inner wall provided with a semi-circular locking flange 122 located in the clamping block 121 and inserted into the locking groove 421 of the mounting stud 42 when the two shells 101 of the clamping housing 10 are combined together to secure the mounting stud 42 of the secondary handlebar 40 between the two shells 101 of the clamping housing 10 and to attach the secondary handlebar 40 to the clamping housing 10.

Figure 11:
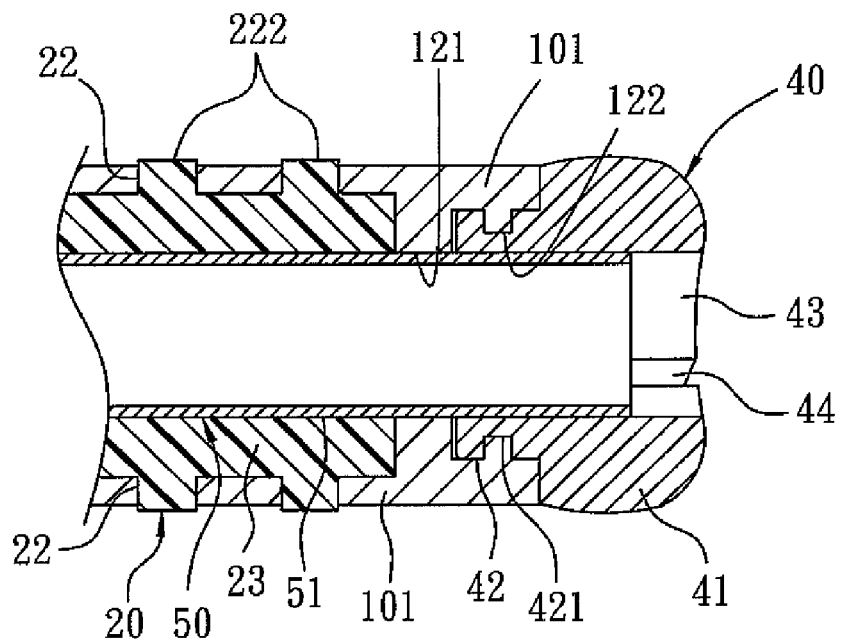
FIG. 11 is a partially front cross-sectional assembly view of the handlebar grip for a bicycle as shown in FIG. 10.
Figure 10:
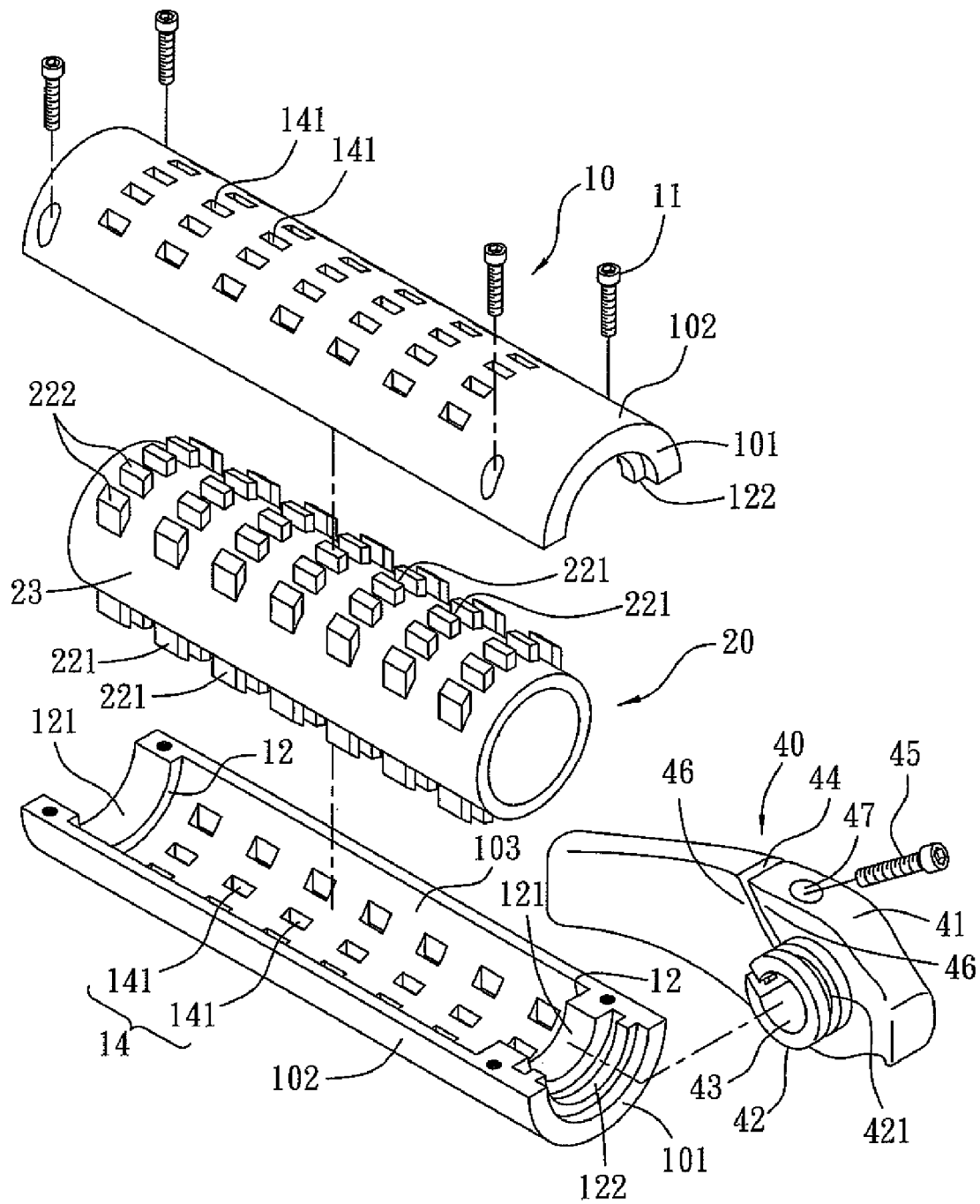
FIG. 10 is an exploded perspective view of a handlebar grip for a bicycle in accordance with another preferred embodiment of the present invention.

Referring to FIGS. 10 and 11, the secondary handlebar 40 has a mounting hole 43 extending through the holding portion 41 and the mounting stud 42 and mounted on the outer wall 51 of the handlebar 50 and has a clamping slit 44 extending through the holding portion 41 and the mounting stud 42 and connected to the mounting hole 43. The handlebar grip further comprises a fastening bolt 45 extending through a through bore 47 of the secondary handlebar 40 to compress two spaced opposite sides 46 of the clamping slit 44 of the secondary handlebar 40 by rotation of the fastening bolt 45 so as to compress the mounting hole 43 and the clamping slit 44 of the secondary handlebar 40 and to clamp the secondary handlebar 40 onto the outer wall 51 of the handlebar 50.

Figure 12:
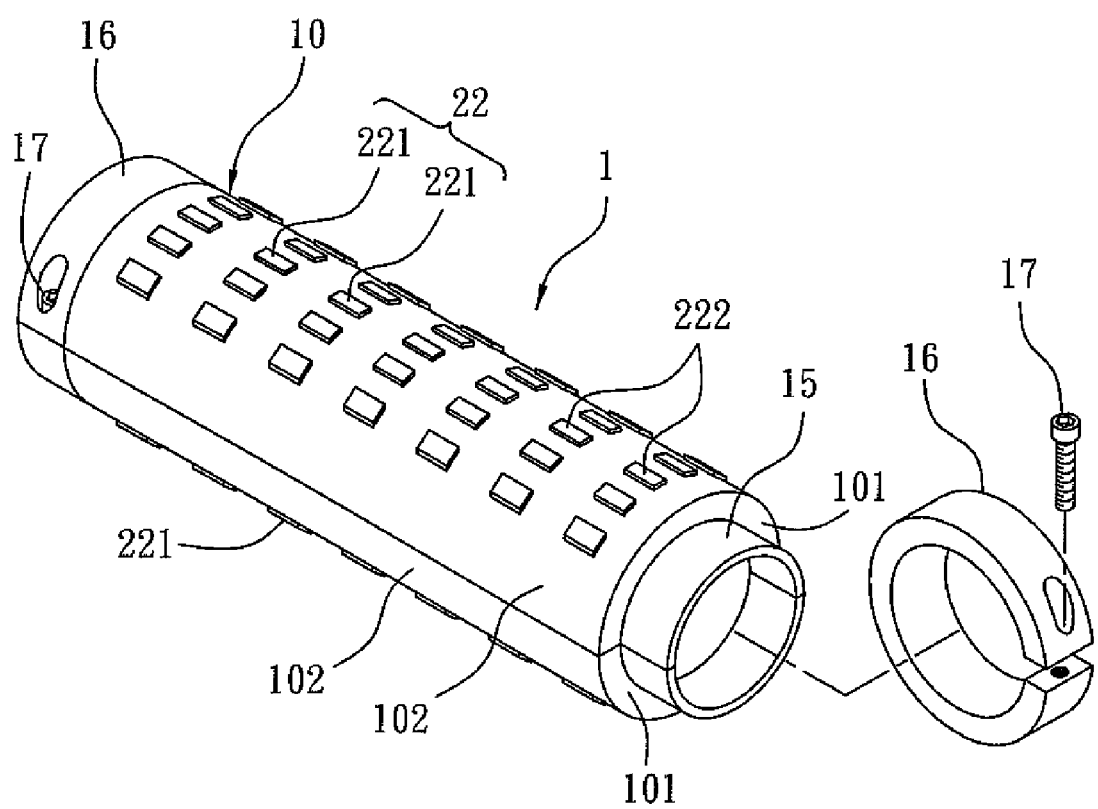
FIG. 12 is a partially exploded perspective view of a handlebar grip for a bicycle in accordance with another preferred embodiment of the present invention.

Referring to FIG. 12, each of the two shells 101 of the clamping housing 10 is provided with two opposite reduced clamping portions 15 pressing the outer wall 51 of the handlebar 50, and the handlebar grip further comprises two opposite C-shaped clamping members 16 each clamped onto a respective one of the two clamping portions 15 of the clamping housing 10 by a fastening bolt 17 to compress the respective clamping portion 15 of the clamping housing 10 on the outer wall 51 of the handlebar 50 to lock the clamping housing 10 onto the handlebar 50.

Accordingly, the two shells 101 of the clamping housing 10 and the inner sleeve 20 can be changed individually according to a user's requirement, thereby enhancing the versatility of the handlebar grip. In addition, the inner sleeve 20 can be replaced individually when it is dirty or worn out without having to replace the clamping housing 10 simultaneously, thereby decreasing the costs of material. Further, the two shells 101 of the clamping housing 10 and the inner sleeve 20 have a modularized design to enhance the variation of the handlebar grip, thereby satisfying the user's requirement. Further, the clamping housing 10 is made of hard material to enhance the strength of the handlebar grip, and the inner sleeve 20 is made of soft material to provide a comfortable sensation to the user. Further, the end plug 30 or the secondary handlebar 40 is directly mounted on the clamping housing 10 without needing to provide a metallic clamping ring, thereby decreasing the costs of material. Further, the clamping housing 10 clamps the outer wall 51 of the handlebar 50, and the protruding portion 22 of the inner sleeve 20 is locked in the hollow portion 14 of the clamping housing 10, so that the inner sleeve 20 is clamped between the clamping housing 10 and the handlebar 50 solidly and stably. Further, the inner sleeve 20 is directly mounted on the outer wall 51 of the handlebar 50, and the two shells 101 of the clamping housing 10 are directly mounted on the inner sleeve 20, so that the inner sleeve 20 is mounted between the clamping housing 10 and the handlebar 50 easily and quickly, thereby facilitating assembly of the handlebar grip. Further, the two shells 101 of the clamping housing 10 and the inner sleeve 20 are made individually without interfering with each other, thereby enhancing the productive quality of the handlebar grip.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A handlebar grip, comprising:
a handlebar;
two opposite shells detachably combined with each other to form a hollow clamping housing which presses an outer wall of the handlebar and is provided with at least one hollow portion;
an inner sleeve clamped between an inner wall of the clamping housing and the outer wall of the handlebar and having an outer wall provided with at least one protruding portion extending through the hollow portion of the clamping housing and protruding outwardly from an outer wall of the clamping housing to form a holding surface, the inner wall of the clamping housing is provided with two opposite annular stop ribs extending radially and inwardly and abutting two opposite ends of the inner sleeve to limit the inner sleeve in the clamping housing;
the inner wall of the clamping housing forms an annular receiving chamber located between the two stop ribs to receive the inner sleeve when the two shells of the clamping housing are combined together, and
each of the two stop ribs of the clamping housing has a surface provided with an arc-shaped clamping block pressing the outer wall of the handlebar when the two shells of the clamping housing are combined together.

2. The handlebar grip in accordance with claim 1, wherein each of the two shells of the clamping housing is made of a metallic material.

3. The handlebar grip in accordance with claim 1, wherein the inner sleeve is made of plastic material.

4. The handlebar grip in accordance with claim 1, wherein the hollow portion of the clamping housing is provided on each of the two shells.

5. The handlebar grip in accordance with claim 1, wherein
the hollow portion of the clamping housing includes at least one through hole;
the protruding portion of the inner sleeve includes at least one protruding block inserted into and protruding outwardly from the through hole of the hollow portion of the clamping housing.

6. The handlebar grip in accordance with claim 1, wherein the inner sleeve has a tubular shape.

7. The handlebar grip in accordance with claim 1, wherein the two shells of the clamping housing are combined together by a plurality of locking bolts.

8. The handlebar grip in accordance with claim 7, wherein each of the two shells of the clamping housing has two opposite sides each having two opposite ends to allow passage of the locking bolts so as to combine the two shells of the clamping housing together.

9. The handlebar grip in accordance with claim 1, further comprising:
an end plug mounted on an outer end portion of the clamping housing to seal the outer end portion of the clamping housing.

10. The handlebar grip in accordance with claim 9, wherein
the end plug has a first side provided with a sealing plate located outside of and abutting the outer end portion of the clamping housing and a second side provided with a mounting stud which extends into the outer end portion of the clamping housing and has an outer wall provided with an annular locking groove;
the mounting stud of the end plug is clamped between the two shells of the clamping housing;
each of the two shells of the clamping housing has an inner wall provided with a semi-circular locking flange inserted into the locking groove of the mounting stud when the two shells of the clamping housing are combined together to secure the mounting stud of the end plug between the two shells of the clamping housing and to attach the end plug to the clamping housing.

* * * * *